United States Patent [19]

Olson

[11] 3,928,853

[45] Dec. 23, 1975

[54] DECOUPLING APPARATUS FOR A COMMON-ANTENNA RECEIVE-TRANSMIT SYSTEM

[75] Inventor: Irving C. Olson, San Diego, Calif.

[73] Assignee: The United States of America as represented by the Secretary of the Navy, Washington, D.C.

[22] Filed: Nov. 29, 1974

[21] Appl. No.: 528,110

Related U.S. Application Data

[63] Continuation-in-part of Ser. No. 218,985, Jan. 19, 1972, abandoned.

[52] U.S. Cl. .................... 343/180; 325/22; 333/10; 333/24 R

[51] Int. Cl.[2] .................... H04L 5/00; H04B 1/44

[58] Field of Search .................... 325/15–23, 325/25; 343/180, 175; 333/1.1, 10, 12, 13, 333/22, 24

[56] References Cited

UNITED STATES PATENTS

| | | | |
|---|---|---|---|
| 1,973,298 | 9/1934 | Sloggett et al. | 325/22 |
| 3,449,674 | 6/1969 | Pace | 325/21 |
| 3,636,452 | 1/1972 | Nuding | 333/10 |

*Primary Examiner*—Albert J. Mayer
*Attorney, Agent, or Firm*—R. S. Sciascia; G. J. Rubens

[57] ABSTRACT

In communications systems, decoupling apparatus for enabling the use of a common antenna to simultaneously perform transmit and receive functions. Inductive and capacitive decoupling circuits in the apparatus provide decoupling from a common transmitting antenna in a manner substantially independent of transmitter-multicoupler off-resonance impedance and further provide decoupling as a function of frequency whereby the communications system is atmospheric-noise limited over the frequency band of interest.

1 Claim, 3 Drawing Figures

DECOUPLING APPARATUS FOR A COMMON-ANTENNA RECEIVE-TRANSMIT SYSTEM

This application is a continuation-in-part of application Ser. No. 218,985, filed Jan. 19, 1972, abandoned.

BACKGROUND OF THE INVENTION

Due to topside space limitations on Navy ships, antenna structures are often located in close proximity to other antennas or nonradiating structures whereby undesirable close coupling and transfer of RF power result. Consequently, the self-impedance of the antennas is modified by the mutual impedance, power transfer from the transmitting antennas creates receiver interference and portions of the transferred power are reradiated with phase differences, resulting in undesired radiation-pattern directivity. These undesirable effects on communication system performance are obviously magnified as more antennas and structures, especially for HF communications systems, are added to the topside of Navy ships. The use of resonant couplers restricts the use of the antenna to only one receiver or transmitter.

The novel decoupler apparatus to be disclosed herein can substantially minimize the aforementioned undesirable effects by enabling the use of a common antenna to simultaneously perform receive and transmit functions in a manner to be described hereinafter.

SUMMARY OF THE INVENTION

Decoupler apparatus are disclosed for use in naval communication systems to enable the use of a common antenna to perform both receive and transmit functions simultaneously. The apparatus includes capacitive and inductive circuitry to provide decoupling from a transmitter antenna in a manner substantially independent of transmitter-multicoupler off-resonance impedance. The apparatus further provides decoupling as a function of frequency such that the associated communications system is atmospheric-noise limited over the frequency band of interest.

STATEMENT OF THE OBJECTS OF INVENTION

It is the primary object of the present invention to advance the of communications system by disclosing novel decoupler apparatus which can be used most advantageously in a limited space environment to enable the use of a common antenna to perform simultaneously both receive and transmit functions.

Other objects, advantages and novel features of the invention will become apparent from the following detailed description of the invention when considered in conjunction with the accompanying drawings.

DESCRIPTION OF THE PREFFERED EMBODIMENTS

Figure 1:
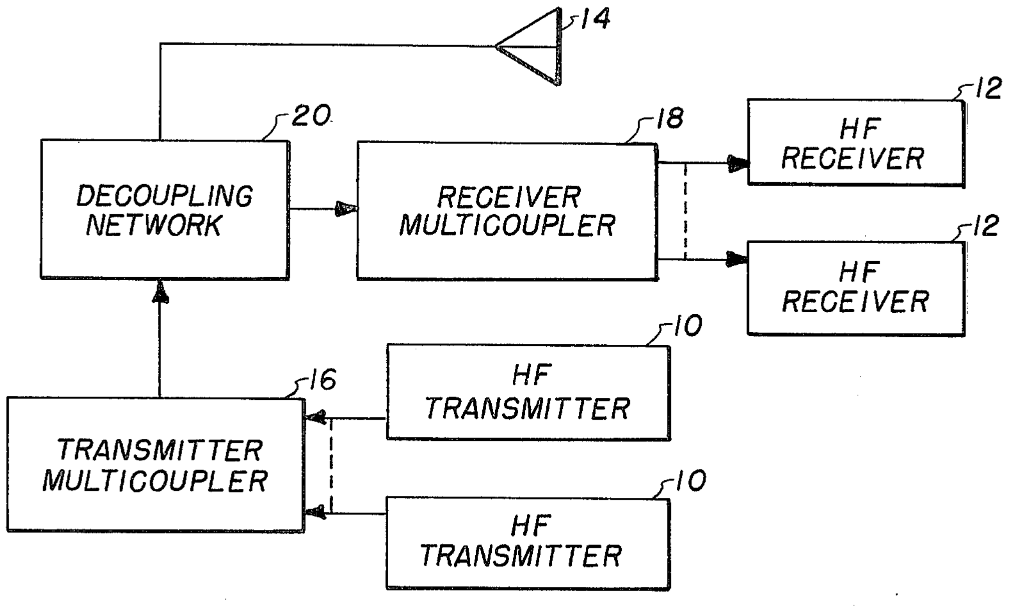
FIG. 1 is a simplified block diagram of a communications system wherein the novel decoupler apparatus to be disclosed herein enables the use of a common antenna to perform simultaneously both receive and transmit functions.

The preferred embodiment of the present decoupler inventive concept is illustrated in FIG. 1 in combination with a conventional HF communication system typically found on naval ships. The system includes the HF transmitters 10 and receivers 12 which are electrically connected to a common antenna 14 through the conventional transmitter and receiver multicouplers 16 and 18, respectively. The multicoupler outputs are in turn connected to the antenna 14 through the novel decoupler network 20 which will be described in detail hereinafter.

In the preferred embodiment, the system of FIG. 1 is operable for simultaneous transmitting over a frequency range of, for example, 2-to-6 MHz (eight channels) and receiving over a frequency range of, for example, 2-to-30 MHz (twenty channels). The transmitter and receiver multicouplers 16 and 18 can comprise well-known devices designated by the Navy as AN/SRA-56 and AN/SRA-49, respectively.

In operation, the decoupler network 20 functions to protect the receiver multicoupler 18 from the high-power transmitters 10 that are connected to the common antenna 14 through the transmitter multicoupler 18 which provides the selectivity required for the transmission frequencies to be within a given percentage (e.g., 5%) of the reception frequencies without causing receiver overload or crossmodulation.

Figure 2:
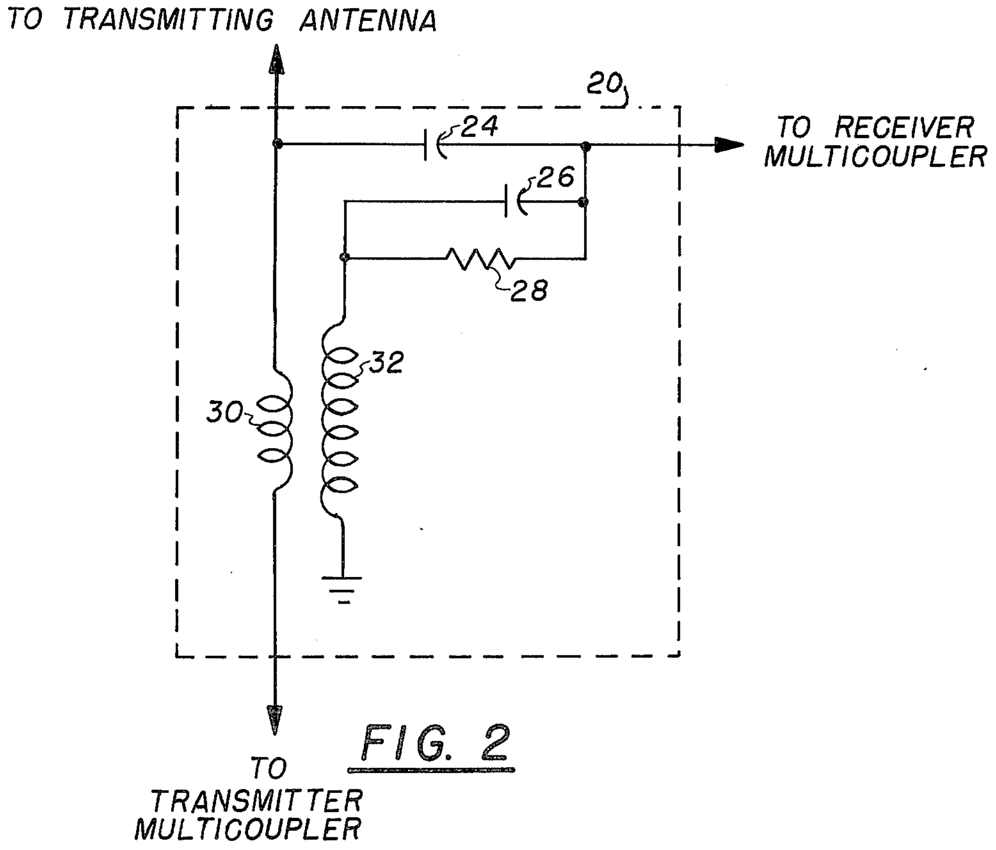
FIG. 2 is a schematic drawing of the preferred embodiment of the decoupler apparatus of FIG. 1.

The decoupling network 20 which is shown schematically in FIG. 2, embodies the concept that coupling to the antenna 14 must be sufficiently large to make the receiving system atmospheric-noise limited, but not so large that the antenna VSWR is increased to a level that degrades the operation of the transmitter multicoupler 16.

Accordingly, in view of the above, a resistive divider is not used to decouple from the transmitting antenna 14 because it would be too lossy and would operate non-linearly, thereby creating intermodulation. A parallel capacitor, however, can be used to decouple from the antenna in a medium-to-high impedance level system, and a series inductor with magnetic coupling to another inductor can be used in a low impedance level system.

Since the off-resonance impedance of transmitter multicouplers as seen from the antenna side (the output side) can vary from a low-to-high impedance level, the present invention employs both inductive and capacitive decoupling as shown schematically in FIG. 2 which is a schematic drawing of the preferred embodiment of the decoupler 20 of FIG. 1.

As shown in FIG. 2, the decoupling network 20 essentially comprises a first capacitor 24 connected between the transmitting antenna 14 and the receiver multicoupler 18. Connected between the transmitting antenna 14 and the transmitter multicoupler 16 are two mutually-coupled inductors 30 and 32. Inductor 32 is connected at its upgrounded end in series with an RC circuit consisting of capacitor 26 and resistor 28 to receiver multicoupler 18.

Operationally, the capacitor 24 decouples energy from the antenna 14 in a medium-to-high impedance level system, and the inductor circuit decouples energy in a low impedance level system.

As previously stated, the present inventive concept embodies the requirement that the receiving system must be limited by atmospheric-noise. For purposes of illustration, on the basis of expected ambient-noise levels, receiver-multicoupler insertion loss, and receiver noise figure, a decoupling of approximately 25 db/ at 2MHz will be assumed to descride the above design of the decoupling network 20. Also because of the magnitude of power that would be coupled to the receiving system of 6MHz, for example, a decoupling at that frequency of 14db will be assumed for purposes of illustration.

By means of a 50-ohm system with a very high impedance (open circuit) at the transmitter multicoupler port, it was discovered that if the capacitor 24 had a value of 80-pF, the decoupler could provide a 14db decoupling between the antenna port and the receiver multicoupler port at 6MHz. The resulting decoupling between the antenna port and the receiver multicoupler port with the transmitter multicoupler port open-circuited for a 2-to-30-MHz frequency range is shown by the curve 40 of FIG. 3. This curve represents the desired decoupling network performance independent of the transmitter multicoupler off-resonance impedance as earlier mentioned.

Figure 3:
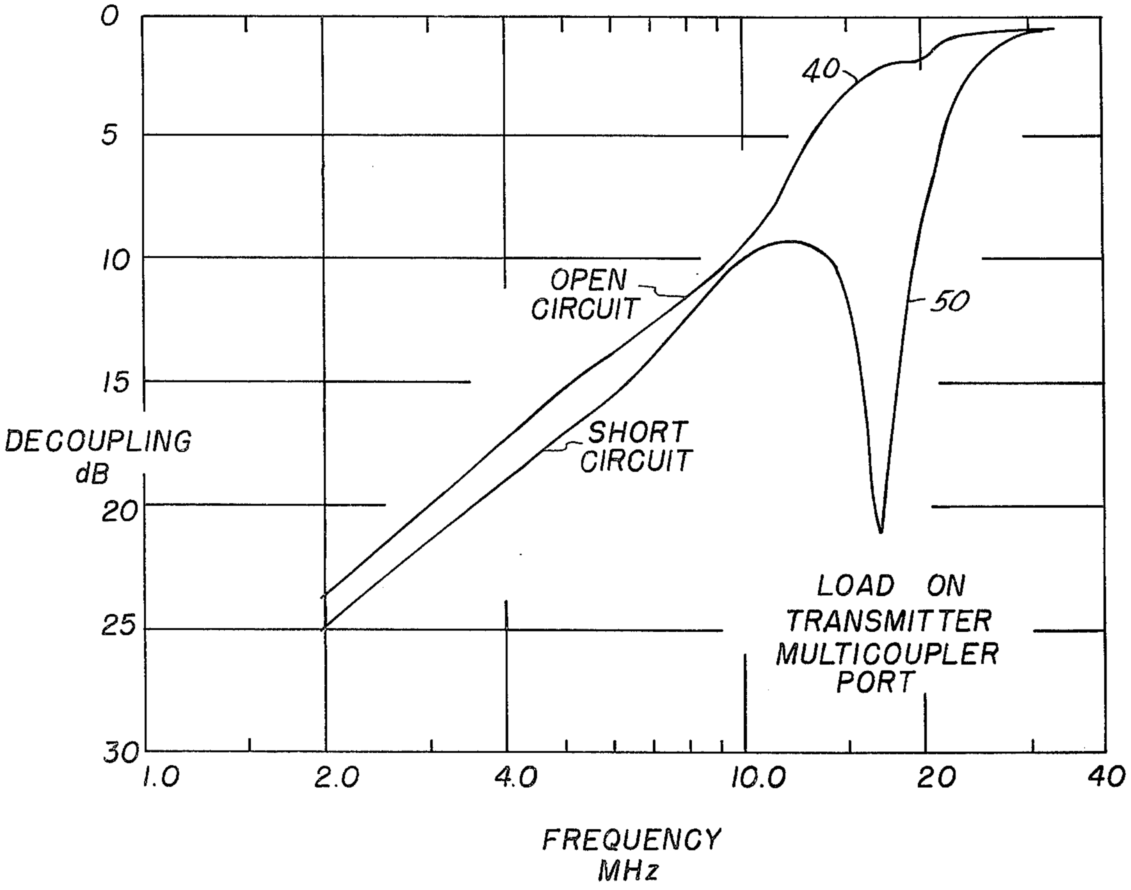
FIG. 3 is an exemplary graphical illustration of the decoupling as a function of frequency which can be achieved with the apparatus of FIG. 2.

Next, curve 40 of FIG. 3 was matched to a response curve 50 for the circuit with a short-circuit condition at the transmitter multicoupler port. With this condition the desired response is provided by the coupled inductors 30 and 32. The value of the inductor 32 should be minimized to reduce its effect on the antenna VSWR as seen by the transmitter multicoupler.

To illustrate the above, the inductor 30 was chosen to have an inductance of approximately 0.6 uH, which value represents the approximate maximum series inductance tolerable at 6MHz. The value of the inductor 32 was then determined to be approximately 2.5 uH. The inductor 32 was then coupled to the inductor 30 to provide the exemplary decouplings of 25db at 2MHz and 14db at 6MHz.

The second capacitor 26 and the resistor 28 were placed in the circuit to remove or "de-Q" predetermined resonances whereby the curve 50 of FIG. 3 was produced.

It is to be understood that values for the components of decoupling network 20 should be chosen such that it is non-resonant in the 2–30MHz frequency range.

It should be appreciated that the transmitting antenna port and the transmitter multicoupler port are not interchangeable since it is desirable that the isolation between the transmitter multicoupler port and the receiver multicoupler port be greater than that existing between the transmitting antenna port and the receiver multicoupler port.

Thus, it can be seen that a novel decoupling apparatus has been disclosed which enables a common antenna to be used to simultaneously perform transmit and receive functions.

Obviously many modifications and variations of the present invention are possible in the light of the above teachings. It is therefore to be understood that within the scope of the appended claims the invention may be practiced otherwise than as specifically described.

What is claimed is:

1. Communication system apparatus comprising:

reciprocal antenna means;

a first multicoupler means having input means and output means;

a plurality of transmitter means connected to the input means of said first multicoupler means;

a second multicoupler means having input means and output means;

a plurality of receiver means connected to the output means of said second multicoupler means;

non-resonant means having a first port connected to the output means of said first multicoupler, a second port connected to the input means of said second multicoupler, and a third port connected to said antenna means, said non-resonant means comprising capacitive means connected between said second and third ports, first inductive means connected between said first and third ports and a second inductive means connected between said second port and ground and being magnetically coupled to said first inductive means whereby said capacitive means and said second inductive means decouple received energy from said antenna means to said second multicoupler means over a predetermined frequency range substantially independent of the impedance of said first multicoupler means and said first inductive means simultaneously couples energy from said first multicoupler means to said antenna means.

* * * * *